(No Model.)
H. F. SMITH.
SAFETY HOOK.
No. 248,957. Patented Nov. 1, 1881.
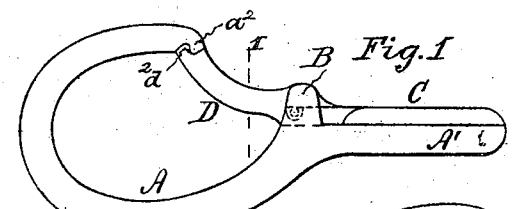
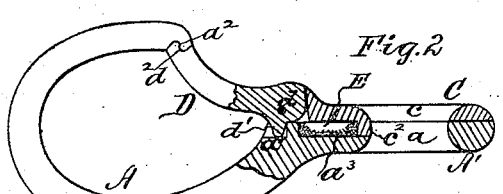
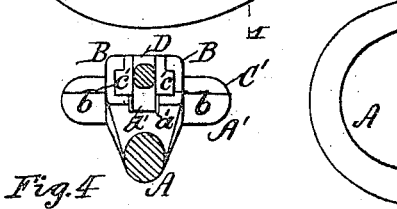
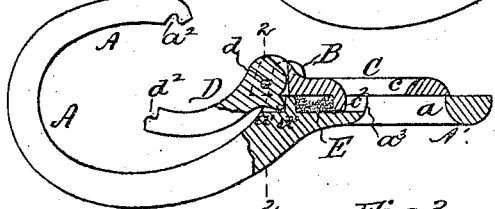
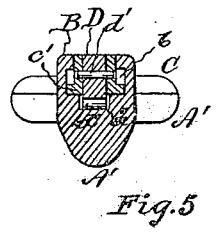
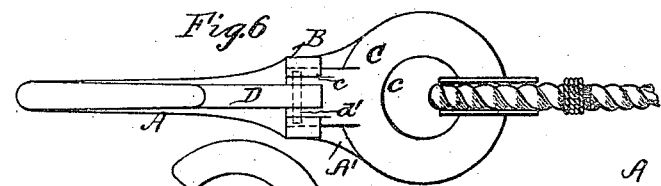
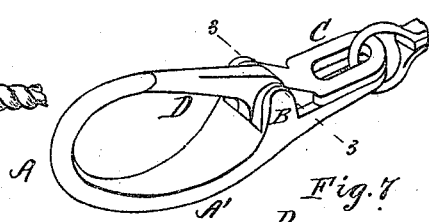
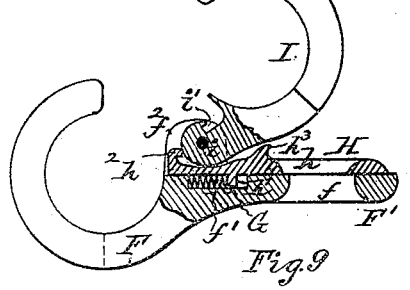
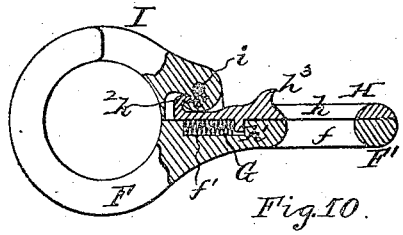
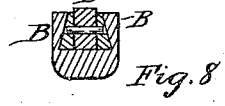
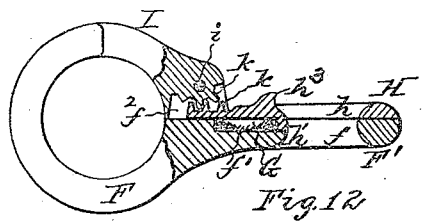
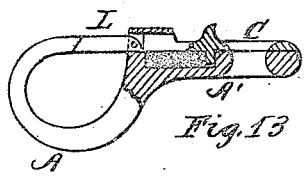
WITNESSES:
INVENTOR,
Henry F. Smith,
By Connolly Bros,
ATTORNEYS.

UNITED STATES PATENT OFFICE.

HENRY F. SMITH, OF PHILADELPHIA, PENNSYLVANIA.

SAFETY-HOOK.

SPECIFICATION forming part of Letters Patent No. 248,957, dated November 1, 1881.

Application filed November 6, 1880. (No model.)

*To all whom it may concern:*

Be it known that I, HENRY F. SMITH, a citizen of the United States, residing at the city of Philadelphia, in the county of Philadelphia and the State of Pennsylvania, have invented certain new and useful Improvements in Safety-Hooks, of which the following is a specification, reference being had to the accompanying drawings, wherein—

Figure 1 is a side elevation of a safety-hook embodying my improvements. Figs. 2 and 3 are vertical longitudinal sections, partly in elevation, showing, respectively, the hook closed and opened. Fig. 4 is a section on the line 1 1, Fig. 1. Fig. 5 is a like view on the line 2 2, Fig. 3. Fig. 6 is a plan of the hook. Fig. 7 is a perspective of a modified construction of the hook. Fig. 8 is a section on the line 3 3, Fig. 7. Figs. 9, 10, 12, and 13 show modifications of my improvements applied to various styles of hooks; and Fig. 11 is a plan of hook and strap.

My invention has for its object to provide a safety-hook for harness, nautical, and other purposes, so constructed that draft upon it will keep it closed.

My invention consists in the peculiar construction and combination of parts as hereinafter fully described, having reference principally to the provision of a sliding shank having an eye through which the draft chain, rope, or strap passes, and which is connected to the tongue or moving side of a sister hook in such manner that when draft is exerted on said chain, rope, or strap the tongue or moving side of the hook will be kept closed.

I will first describe my improvements as applied to a snap-hook.

Referring to Figs. 1 to 7 in the drawings, A shows the hook proper, which is integral with the shank A', the latter having an eye, $a$, for the passage of the draft-chain, rope, or strap. Said shank is also formed with bosses or cheeks B B, which are grooved on their inner or opposing sides, as shown at $b\ b$.

C represents an upper division of the shank, which is designed to slide on the part A'. Said division C is formed with an eye, $c$, which registers, when the hook is closed, with the eye $a$. It has ribs $c'\ c'$ on either side of its forward end which fit in the grooves $b\ b$, the latter thus forming ways.

D is the tongue, which is pivoted on the sliding shank C at $d$. Said tongue has a nib or projection, $d'$, which impinges upon a shoulder, $a'$, on the shank A', to form a fulcrum for depressing the tongue D to open the hook, and is also notched at $d^2$ to mesh with a corresponding notch, $a^2$, on the extremity of the hook A. The shank A' is also formed with a recess, $a^3$, which receives a spring, E, and the sliding part C has a projection, $c^2$, which enters said recess and bears against the spring therein.

The operation is as follows: The spring E bearing against the projection $c^2$ keeps the sliding part C in the position shown in Figs. 1, 2, 6, and 7. The openings $a$ and $c$ then being in registry and the tongue D thrown up against the hook A, the latter then being closed, draft upon a chain, rope, or strap passing through the eyes $a\ c$, being but a positive substitute or equivalent for the resiliency of the spring, produces or re-enforces the same effect; hence the spring may be dispensed with and the closing of the hook left to depend upon the draft exerted upon the chain, rope, or strap attached to the shanks. In either case—i. e., with or without the spring—the sliding movement of the shank-division C produces a tripping of the projection $d'$ of the tongue D against the shoulder $a'$ of the shank, and causes said tongue to close or move into contact with the hook A; hence the cardinal principle of action is in the sliding movement of the shank or its division C and the throw of the tongue produced thereby, whether such sliding be produced by a spring or a positive movement.

In Fig. 7 is shown a hook in which the spring is dispensed with, the sliding division of the shank being dovetailed into the bosses of the main division of the shank, instead of making the parts with the grooves and ribs $b$ and $c$, as already described, and as shown in Figs. 4 and 5.

Figs. 9, 10, and 12 show my invention as applied to sister or clamp hooks.

F is the stationary hook with shank F', eye $f$, and recess $f'$, the latter containing a concealed spring, G.

H is the sliding division of the shank, having eye $h$ and projection $h'$, which enters the recess $f'$, and is pressed against by the spring G.

I is the movable hook or tongue, pivoted, at $i$, in or between the bosses $f^2\ f^2$ of the stationary hook F. The hook I is formed at its lower or inner end with a nib or catch, $i'$, which engages, when the hook is closed, as shown in Fig. 10, with a similar nib or catch, $h^2$, on the inner end of the sliding shank H. To open this hook the sliding shank is pushed upwardly or inwardly by the pressure applied to the thumb-piece $h^3$, (which is an elevation on the shank H,) until the catch $h^2$ clears the catch $i'$. The hook I is then thrown outwardly on its pivot. To close the hook the part I is merely swung inwardly on its pivot in the usual manner. This hook, the same as that previously described, will be kept closed by draft exerted on the sliding shank.

Fig. 12 shows a modification of the sister hook, having the sliding shank, and in which a rack and pinion, $k\ k'$, on the sliding shank and pivoted hook, respectively, are substituted for the catches $i'\ h^2$. The spring G may, if desired, be dispensed with. Draft upon the sliding shank will also cause this hook to close and be kept closed, as above described.

Fig. 13 shows a modification, wherein the stationary part of the hook is of a modified or different curvature from that of the previous figures, the tongue L being pivoted to and operated by the sliding shank, as already set forth.

What I claim as my invention is as follows:

1. A safety-hook made in three separate and distinct parts, having a shank formed in two divisions, one rigid and the other constructed, substantially as described, so as to slide thereon, and a pivoted tongue or hook controlled by the sliding part of the shank, whereby the hook will be kept closed by draft exerted upon its shank, substantially as set forth.

2. In combination with the stationary shank, sliding part C, and pivoted tongue D, the spring E, fitted in a recess in the stationary shank, and operating to bear against the sliding part, substantially as described.

3. The combination, with shank A', having shoulder $a'$, of sliding shank C, and tripping-tongue D, having fulcrum $d'$, substantially as shown and described.

4. The combination, with stationary shank-division A', having bosses B B, of sliding part C, fitted and adapted to slide on said shank and to be guided by said bosses, and pivoted tongue, substantially as shown and described.

In testimony that I claim the foregoing I have hereunto set my hand this 26th day of October, 1880.

HENRY F. SMITH.

Witnesses:
CHAS. F. VAN HORN,
S. J. VAN STAVOREN.